United States Patent
Willett et al.

[15] 3,693,443
[45] Sept. 26, 1972

[54] INTEGRATING WATER METER

[72] Inventors: Norman F. Willett, 1302 L St; Perry R. Stout, 710 Oak Avenue, both of Fresno, Calif. 95616; James R. Brownell, 5541 N. 6th St., Fresno, Calif. 93726

[22] Filed: Jan. 15, 1971

[21] Appl. No.: 106,869

[52] U.S. Cl.............................73/229, 415/173 R
[51] Int. Cl.................................................G01f 1/02
[58] Field of Search.....................73/229; 415/173 R

[56] References Cited

UNITED STATES PATENTS 1,669,315   5/1928   Wiggins..................73/229 X

*Primary Examiner*—Jerry W. Myracle
*Attorney*—Alexander B. Blair

[57] ABSTRACT

An integrating water meter for use in irrigation ditches to record the volume of water used in irrigating the farmers fields. The meter consist of a small undershot water wheel with flexible vanes supported on each side to improve operation and sealing of the vanes in the raceway. The raceway is a 120° cylindrical segment with an axis that coincides with the axis of the vane rotor. The rotor is connected to a cyclometer to integrate water flow.

5 Claims, 6 Drawing Figures

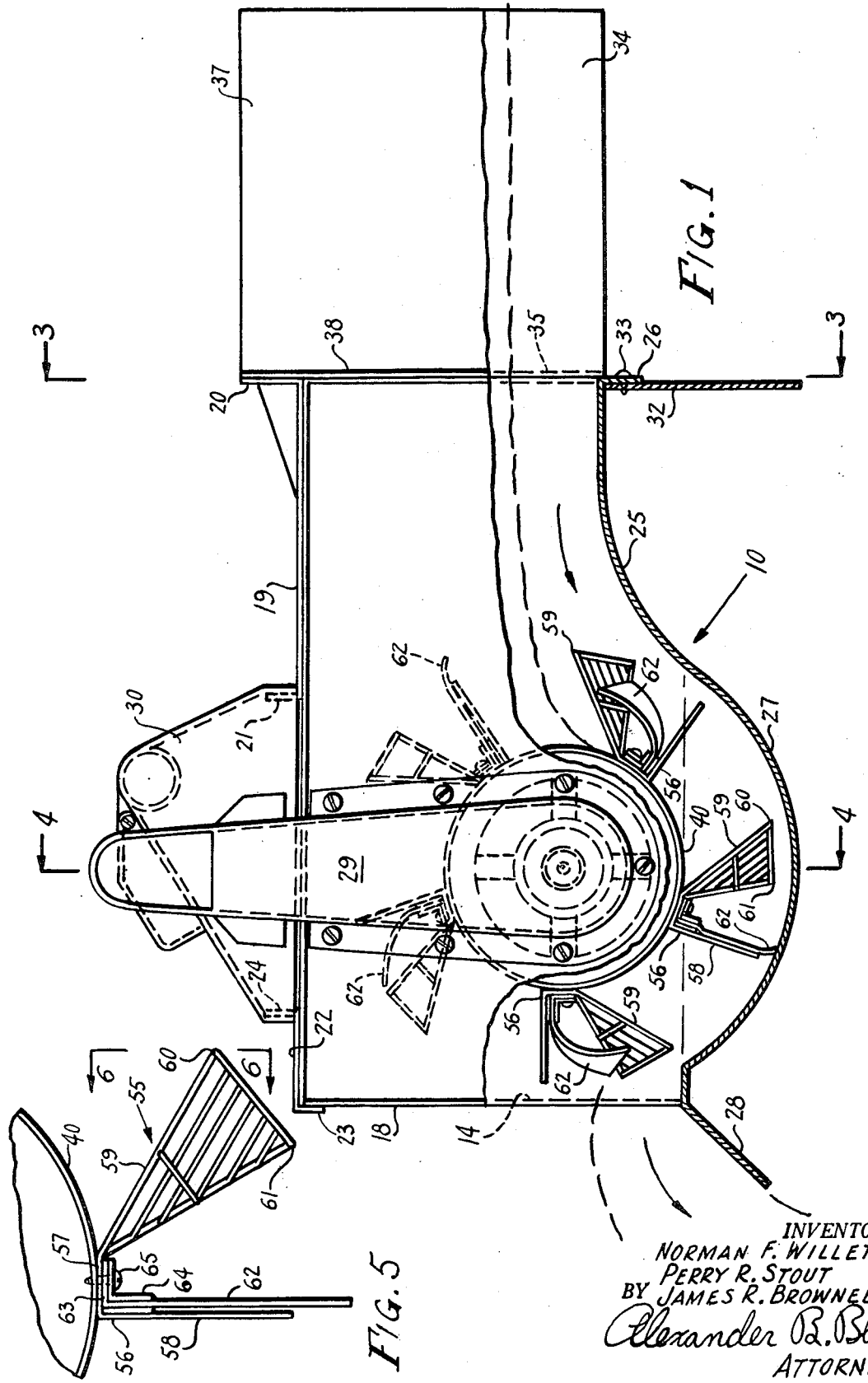

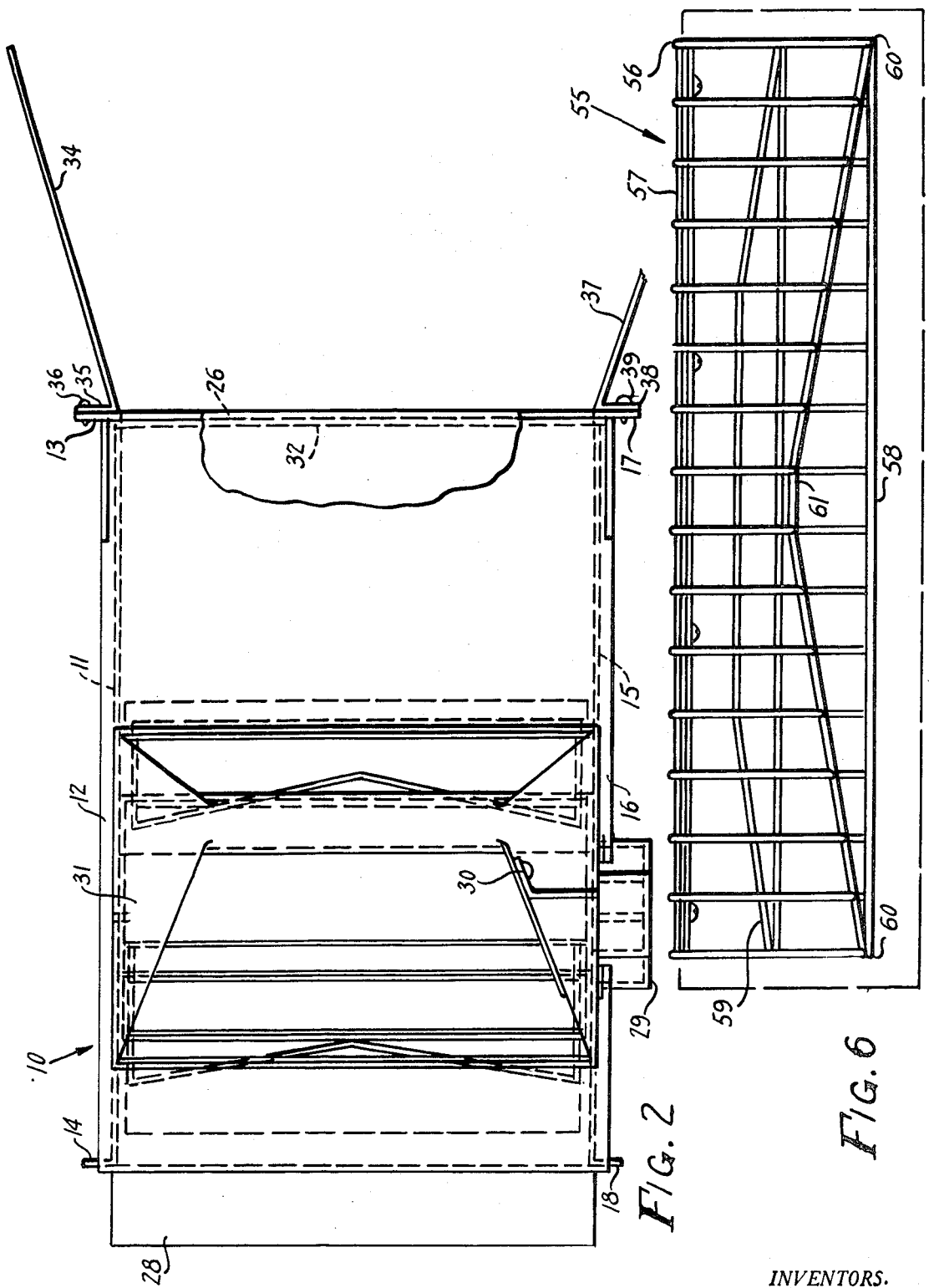

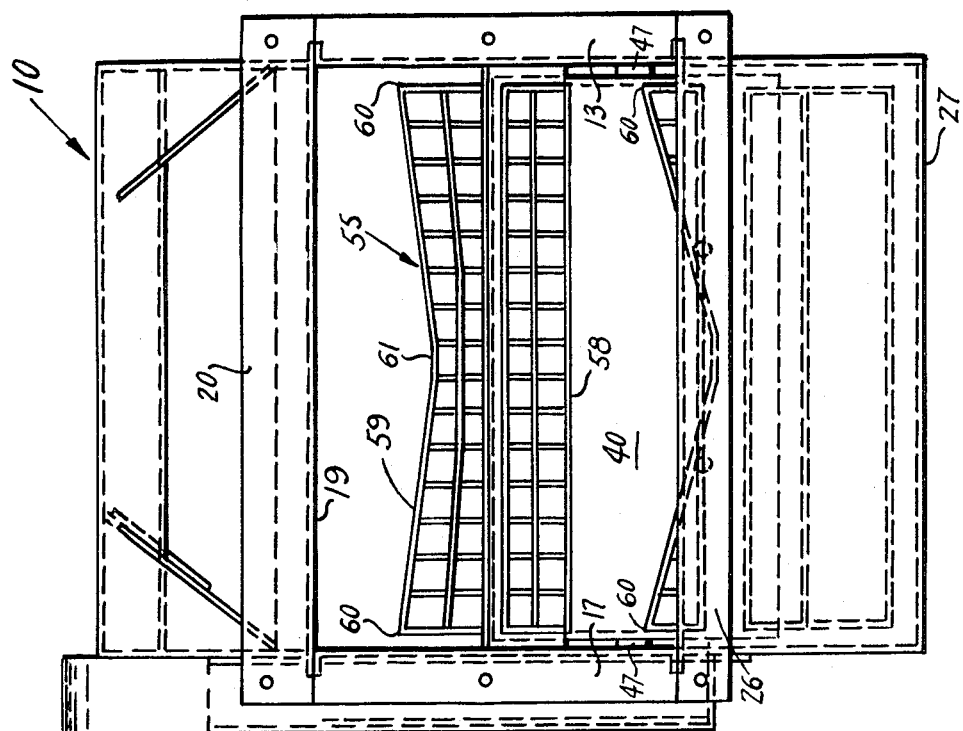
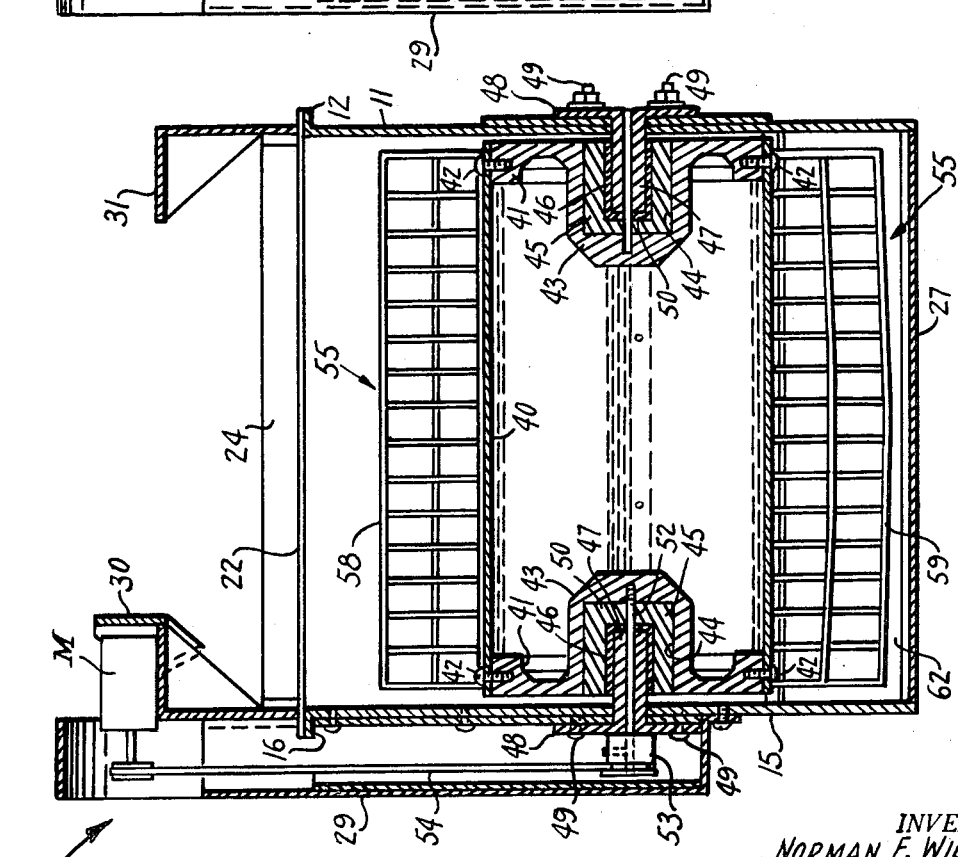

3,693,443

INTEGRATING WATER METER

BACKGROUND OF THE INVENTION

FIELD OF THE INVENTION

The present invention is directed to the measuring of irrigation water with an integrating water meter to determine the total volumetric water used in an irrigation project.

SUMMARY OF THE INVENTION

The present invention includes an undershot water wheel arranged with a relatively large rotor positioned so that all of the water flows downwardly under the rotor causing the water to rotate by impinging against flexible vanes attached to the rotor. The flexible vanes are supported by hardware cloth to improve operation and sealing of the vanes in the raceway.

The primary object of the invention is to provide an integrating water meter which is sensitive to relatively slow flow rates of large volumes of water and which will accurately measure the flow of water therethrough.

Other objects and advantages will become apparent in the following specification when considered in the light of the attached drawings.

BRIEF DESCRIPTION OF THE DRAWINGS

FIG. 1 is a side elevation of the invention shown partially broken away and in section for convenience of illustration;

FIG. 2 is a top plan view of the invention shown partially broken away for convenience of illustration;

FIG. 3 is a rear elevation of the invention as viewed from the line 3—3 of FIG. 1 looking in the direction of the arrows;

FIG. 4 is a vertical sectional view taken along the line 4—4 of FIG. 1 looking in the direction of the arrows;

FIG. 5 is an enlarged fragmentary end elevation of one of the flexible vanes and supports therefor; and FIG. 6 is a rear elevation of one of the vane supports as viewed from the line 6—6 of FIG. 5 looking in the direction of the arrows.

DESCRIPTION OF THE PREFERRED EMBODIMENT

Referring now to the drawings in detail wherein like reference characters indicate like parts throughout the several figures the reference numeral 10 indicates generally an integrating water meter constructed in accordance with the invention.

The meter 10 includes a side plate 11 having a top flange 12, an end flange 13 and a oppositely disposed end flange 14. A second side plate 15 is positioned in spaced apart parallel relation to the side plate 11 and includes a top flange 16, an end flange 17 and an opposite end flange 18. A generally rectangular top wall 19 is positioned on top of the top flanges 12, 16 and is secured thereto. An upright end flange 20 is formed on the top wall 19 in aligned relation to the end flanges 13, 17. A transverse intermediate flange 21 is formed on the top wall 19 forwardly of the end flange 20. A second top wall 22 is positioned on the top flanges 12, 16 respectively at the end thereof opposite the top wall 19. The top wall 22 has an end flange 23 depending therefrom and a oppositely disposed oppositely extending end flange 24 integrally formed thereon. A generally S shaped bottom wall 25 extends between and connects the side walls 11, 15. The bottom wall 25 has an end flange 26 formed thereon and arranged in aligned relation to the side flanges 13, 17. The bottom wall 25 has a concave portion 27 which is formed with a circular curvature. The bottom wall 25 has a downwardly and outwardly sloping apron 28 integrally formed on the down stream end thereof.

A drive belt housing 29 is secured to the side wall 15 and extends upwardly therefrom terminating at a point spaced well above the top wall 22. A support 30 adjacent the side wall 15 cooperates with a support 31 adjacent the side wall 11 to support a cyclometer M of conventional design as shown in FIG. 4.

A spade 32 is secured to the flange 26 by sheet metal screws 33 with the spade 32 extending downwardly parallel to the plane of the flange 26. The spade 32 is adapted to be forced into the dirt in the bottom of the ditch in which the meter 10 is positioned to support the meter and prevent leakage therepast.

A generally rectangular plate 34 is provided with a flange 35 at one end thereof with the flange 35 secured to the flange 13 by means of sheet metal screws 36. The generally rectangular plate 37 is provided with a flange 38 which is secured to the flange 17 by sheet metal screws 39. The plates 34, 37 converge toward the meter 10 to direct water flowing therebetween into the meter 10.

A cylindrical drum 40 is positioned in the meter 10 extending horizontally between the side wall 11 and the side wall 15. A circular hub 41 is secured in each end of the drum 40 by machine screws 42. The hub 41 includes a central cylindrical member 43 having a large cylindrical bore 44 opening outwardly at the ends of the drum 40 and positioned axially of the hub 40. A cylindrical rubber cup 45 is fitted into the cylindrical bore 44 and includes an axial cylindrical bore 46 opening outwardly thereof to the opposite ends of the drum 40. A metal shaft 47 extends into the hub 41 and has a head 48 formed on its outer end secured to the sides 11 and 15 respectively by means of fasteners 49. The shafts 47 are provided with a Teflon cap 50 which also fit the bore 46 of the rubber cup 45.

A bolt 52 extends through a chain sprocket 53, one of the axles 47, the cap 50 and is threaded into the central cylindrical member 43 to lock the sprocket 53 to the drum 40. The bolt 52 is free to rotate in the shaft 47. The central cylindrical members 43 are identical for ease of replacement, however, the threaded bore in the member 43 opposite the sprocket 53 is non-functional. The mounting of the drum 40 provides for a metal-Teflon-rubber water lubricated low friction mounting. To assure alignment the rubber cup 45 is steam vulcanized with the Teflon axle cap in place, which also assures close fit between the Teflon and the rubber. Sufficient space is left between the teflon and the rubber to permit easy slippage particularly when the surfaces are wet.

A drive chain 54 extends from the sprocket 53 upwardly through the housing 29 and is trained over the drive sprocket (not shown) of the cyclometer (not shown).

Five vane units generally indicated at 55 are secured to the drum 40 at 72° intervals thereabout. Each of the vane units 55 includes a hardware cloth vane support 56 having a relatively narrow central portion 57 positioned in contact with the drum 40. A panel 58 is integrally formed with the section 57 and extends perpendicularly outwardly therefrom parallel to the radius of the drum 40. A second panel 59 extends outwardly at an angle to the section 57 and is arranged in generally spaced apart outwardly diverging relation to the panel 58. The section 57 and panels 58, 59 are formed from a single piece of hardware cloth. The corners 60 of the panel 59 are positioned substantially rearwardly from the center 61 thereof for reasons to be assigned. A flexible vane 62 is positioned between the panels 58, 59 and has a flange 63 formed on its inner end arranged in contact with the section 57. An angle iron retainer 64 is positioned in contact with the flange 63 and a plurality of screws 65 extend through the angle iron 64, flange 63 and section 57 to secure the vane unit 55 to the drum 40. The meter 10 provides a raceway which passes beneath the rotor 40 and the space between the arcuate segment 27 of the bottom wall 25 and the rotor 40 serves as a fixed volume through which the water is swept. The rotor is purposely large so that its lower extremity is at the same level as the exit from the raceway to insure complete filling of the space between the vanes 55, before the rotor 40 will turn so that a full volume of water is swept by each vane 55. The five vanes 55 are equally spaced around the rotor 40 at 72° intervals so that at least one vane is always in the raceway. The flexible vane 62 is preferably formed of neoprene rubber sheet. The combination of the rigid panels 58, 59 and the flexible vanes 62 provides efficient entry into the stream flow and the flexible vane 62 is then held by the positive pressure of the water against the stiff panel 58 sealing the vane 62 in the raceway. On exiting from the stream flow the flexible vane conforms to the flow pattern allowing efficient discharge of the water swept through the raceway. The rearwardly sloping lower edge of the panel 59 terminating in its outer corner 60 allows the outside of the flexible vane 62 to fall away from its leading edge. The flexible vane 62 seals against the bottom wall 25 of the raceway and produces a scouring action thereagainst that cleans the meter 10 of silt, gravel, leaves and other debris. The flexible vane 62 makes an efficient entry into the stream flow and does not resist the entry.

Having thus described the preferred embodiment of the invention it should be understood that numerous structural modifications and adaptations may be resorted to without departing from the spirit of the invention.

What is claimed is:

1. A water meter comprising a housing, a recording meter supported on said housing, a rotor extending across said housing and delineating within said housing a raceway dipping completely below the water exit from said housing, a plurality of vane elements secured to said rotor and extending into said raceway, means connected to said rotor for driving said recording meter, said vanes each including a flexible vane and a pair of rigid screen panels spaced apart and positioned on opposite sides of said flexible vane for retaining said flexible vane in position in said raceway.

2. A device as claimed in claim 1 wherein said rigid panels are integral and are secured to said rotor by a plurality of separable fasteners.

3. A device as claimed in claim 1 wherein five vane elements are secured to said rotor spaced 72° apart thereabout.

4. A device as claimed in claim 1 wherein an anchor spade is secured to said housing and extends downwardly therefrom for anchoring said housing in an irrigation ditch.

5. A device as claimed in claim 1 wherein a pair of wing panels are secured to said housing for directing water therein.

* * * * *

UNITED STATES PATENT OFFICE
CERTIFICATE OF CORRECTION

Patent No. 3,693,443   Dated September 26, 1972

Inventor(s) NORMAN F. WILLETT ET AL

It is certified that error appears in the above-identified patent and that said Letters Patent are hereby corrected as shown below:

The address for the inventor Norman F. Willett should read -- 1807 Oleander Place, Davis, Calif. 95616 --; and the address for the inventor Perry R. Stout should read -- 710 Oak Avenue, Davis, Calif. 95616 --.

Signed and sealed this 1st day of May 1973.

(SEAL)
Attest:

EDWARD M. FLETCHER, JR.
Attesting Officer

ROBERT GOTTSCHALK
Commissioner of Patents